(12) United States Patent
Pfaffelhuber et al.

(10) Patent No.: US 6,202,786 B1
(45) Date of Patent: Mar. 20, 2001

(54) ABSORBER TO ABSORB ACOUSTIC SOUND WAVES AND METHOD FOR ITS PRODUCTION

(75) Inventors: Klaus Pfaffelhuber, Günzburg; Gerhard Köck, Keinberg; Stefan Lahner, Krumbach, all of (DE)

(73) Assignee: Faist Automotive GmbH & Co. KG, Krumbach (DE)

( * ) Notice: Subject to any disclaimer, the term of this patent is extended or adjusted under 35 U.S.C. 154(b) by 0 days.

(21) Appl. No.: 09/331,095

(22) PCT Filed: Dec. 9, 1997

(86) PCT No.: PCT/EP97/06872

§ 371 Date: Jun. 16, 1999

§ 102(e) Date: Jun. 16, 1999

(87) PCT Pub. No.: WO98/27541

PCT Pub. Date: Jun. 25, 1998

(30) Foreign Application Priority Data

Dec. 17, 1996 (DE) ................................. 196 52 527

(51) Int. Cl.[7] ........................................ E04B 1/82
(52) U.S. Cl. ............................ 181/286; 290/295
(58) Field of Search ........................ 181/284, 286, 181/287, 288, 290, 291, 294, 295

(56) References Cited

U.S. PATENT DOCUMENTS 4,425,981 * 1/1984 Kiesewetter et al. ............... 181/286
4,782,913  11/1988 Hoffman et al. ..................... 181/286

FOREIGN PATENT DOCUMENTS

| 3123355 | 6/1981 | (DE) . |
| 3313001 | 4/1983 | (DE) . |
| 3545997 | 12/1985 | (DE) . |
| 3615360 | 5/1986 | (DE) . |
| 29605599 U | 3/1996 | (DE) . |
| 2252073 | 7/1992 | (GB) . |

OTHER PUBLICATIONS

PCT International Search Report, International Application No. PCT/EP 97/06872, Date of Mailing of the International Search Report Jun. 2, 1998, 6 pages.

Certificate of Translator Alois Jackl, PCT/EP97/06872, Oct. 14, 1999 (1 page).

* cited by examiner

Primary Examiner—Khanh Dang
(74) Attorney, Agent, or Firm—Hopgood, Calimafde, Judlowe & Mondolino, LLP

(57) ABSTRACT

In a so-called "hollow chamber absorber" comprising chamber-shaped intermediate cavities (7) between a supporting body (1), spacers (2) and a covering layer (5) acting as a covering unit (11), simultaneous deformation and connection of the covering layer (5) with the edge (4) of the supporting body (1) and the open front ends (3) of the spacers (2) of the preformed basic constructional unit (10) occur by using a stamp (8) whose front face (9) is configured according to the final state of the covering unit (11) on the basic constructional unit (10).

54 Claims, 3 Drawing Sheets

ABSORBER TO ABSORB ACOUSTIC SOUND WAVES AND METHOD FOR ITS PRODUCTION

BRIEF STATEMENT OF THE INVENTION

The invention relates to an absorber for absorbing acoustic sound waves and a method for its production.

BACKGROUND OF THE INVENTION

Such absorbers have already been known (DE 36 15 360 C2, WO 96/08812, DE-OS 27 24 172, DE 33 13 001 A1). Therein, honeycomb-like chambers in the basic constructional unit, which consists of a supporting body and spacers and is produced via injection-moulding or an RIM-process, are covered in the direction of the sound source by a covering layer. The covering layer comprises burl-like air chambers so that there occurs frictional damping when the "air cushions" vibrate and hit the edges of the spacers or it is smoothly tentered over a porous basic unit consisting of foamed plastic, in particular, and is welded therewith at certain locations.

It is the object underlying the invention to simplify an absorber of this type as regards its production and to improve it as regards its function. Furthermore, its disposability shall, if possible, be improved in that reusable material parts are used, in particular.

The invention is characterised in claim 1 as regards the absorber and in claim 8 as regards the production method. Further improvements are claimed in the subclaims.

The absorber is produced from two respectively integral units. The spacers and the supporting body constitute a preformed basic constructional unit which consists more particularly of deep-drawn or transfer-moulded thermoplastic like polypropylene (PP), pressed thermoplastic or thermosetting plastic, injection-moulded thermoplastic or thermosetting plastic, relief-pressed or, respectively, relief-injected plastics, namely with fibre reinforcements, in particular. These materials may be produced both from new and recycled products.

The following deformation processes may be used for producing the basic constructional unit, in particular:

1. Low Pressure Technology (LPT), wherein plastic is pressed into the respective mould at low pressure between about 10 and 100 bar. Long glass fibers (LFG) having a fiber length of about 12 mm may also be used. In heating duct technology, PP (polypropylene) in particular is mixed with 20% of talcum.
2. Reaction Injection Moulding (RIM), wherein PU (polyurethane) is preferably used as the plastic. In the case of fiber reinforcements (R-RIM) glass fibers are used in order to promote thermal stability. Transfer moulding is carried out at a low pressure of up to about 15 bar.
3. Resin Transfer Moulding (RTM), wherein plastic, more particularly epoxy, phenolic, vinyl resins, optionally reinforced with glass fibers, are pressed into the closed mould, preferably at a low pressure of up to about 20 bar.
4. Injection Moulding, wherein high pressure between about 350 and 700 bar is used for filling the polymer plastic into the casting mould. Reinforcements may equally be used.
5. Glass-mat reinforced thermoplastic method (GMT or AZDEL), wherein PP, for instance, is press-moulded with a glassfiber mat at pressures between about 150 and 200 bar.

For relief-pressed plastic, the plastic is press-moulded with a textile structure or a film between press moulds via LPT or GMT whereas, for relief-injected plastic, the plastic is injected onto the textile structure or the film in an injection mould.

On the other hand, the thin covering unit is a particularly thin covering layer which is pressed directly onto the basic constructional unit from a straight plane and deformed in the process, but which is able to vibrate in certain regions at least. The vibrant regions should respectively be situated between those locations of the covering unit which are substantially rigidly connected with open front ends of spacers, via plastic welding connections in particular. Such welding connections may be realised in that the thermoplastic is heated by means of heat rays, for instance, but also via RF or ultrasonic welding. The covering layer closes the individual resonance chambers both outwardly and between each other.

The covering layer for instance consists of a thin layer of thermoplastics like polypropylene, for instance. However, it may also consist of a fleece. It is preferably configured as a composite material like a laminate of different individual layers. The layer thickness should be situated in the range between 0.5 and 8 mm.

It may be useful for some applicational cases to produce the covering layer from a double layer which on the one hand consists of a thin metal layer of aluminium, in particular, having a thickness between 5 and 200 $\mu$m and on the other hand of a thermoplastic plastic like polypropylene, for instance, and/or a fleece which is attached to the side of the aluminium layer facing the basic constructional unit. This thermoplastic layer than constitutes the connecting layer towards the edge of the supporting body on the one hand and towards the front ends of the spacers on the other hand.

The two constructional units are preferably produced via the following process:

First a flat blank or a flat web of the single-layered or multi-layered covering layer is tentered in a straight plane over the preformed basic constructional unit. Subsequently, a stamp is pressed onto the covering layer in the direction towards the basic constructional unit. The stamp front face comprises sort of a "countersurface" against the surface which the covering unit is to occupy in the final state of the basic constructional unit. Thus, the stamp serves as a deformation tool since it deforms the covering layer and presses it onto the open front ends of the spacers and the edge of the basic constructional unit. Due to this deformation, the covering layer assumes the moulded shape wherein it constitutes the covering unit for the absorber. Said layer is simultaneously attached to the basic constructional unit so that it does not "spring back" into its flat initial state.

During this deformation process, the thin covering layer is set onto that side of the basic constructional unit which comprises the open front edges of the spacers between which the intermediate cavities are situated.

Attachment of the covering unit, i.e. connection of the adjacent portions, namely of the edge of the supporting body and open front ends of the desired spacers with the supporting body is more particularly effected via the use of pressure and heat in the case thermoplastic materials or thermoadhesives. The covering unit may as well be provided with a self-adhering adhesive layer on that side which faces the basic constructional unit, namely the edge and the open front ends of the spacers.

The process feature reading that the deformation of the covering layer and the rigid connection thereof with the preformed basic constructional unit should be effected in the very same tool immediately subsequently in time, which is above all helpful in reducing the production time and decreasing the loss of heat energy.

The advantage of the rigid connection also resides in that a characteristic, which might possibly be inherent to the covering layer, namely a more or less rapid, renewed deformation from the preformed configuration into the initially flat configuration in the course of time, is counteracted. In this respect, there exist more possibilites to use different materials. However, it is essential that the covering unit may vibrate freely, at least in regions between the front ends or, respectively, the front edges of the spacers, and that sound waves are transferred into the intermediate cavities so that sound energy may be dampened or, respectively, absorbed within the chamber-like intermediate cavities between the basic constructional unit on the one hand and the covering unit on the other hand.

Instead or in addition thereto, the covering unit may also be provided with holes enabling sound waves to pass through.

BRIEF DESCRIPTION OF THE DRAWINGS

In the following, a preferred embodiment of the invention will be described in detail upon reference to the drawing; therein.

DETAILED DESCRIPTION OF THE INVENTION

Figure 1:
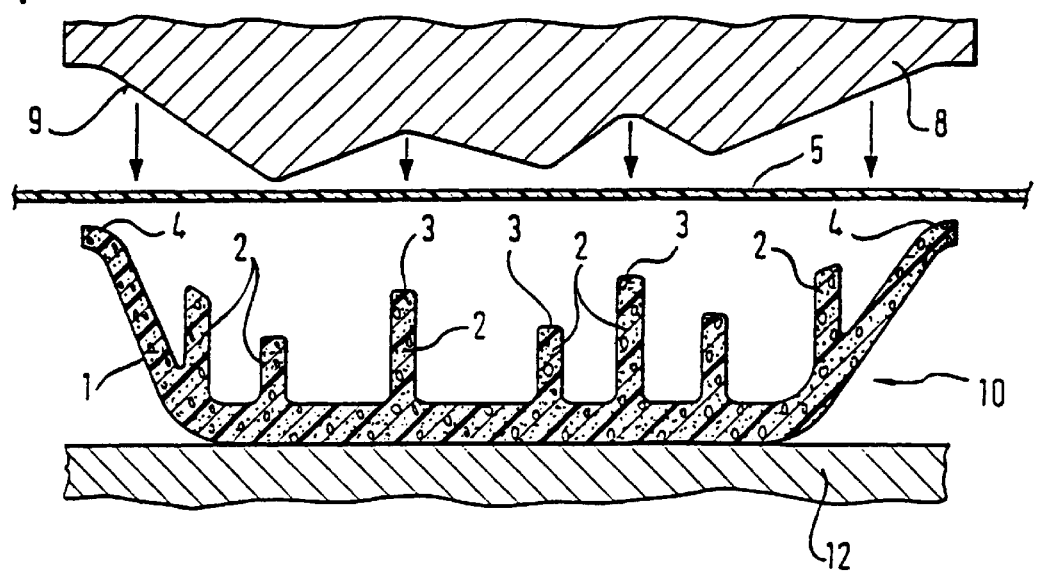
FIGS. 1 to 3 show method steps for the production of an absorber according to the invention in a schematic representation.

According to FIG. 1, a basic constructional unit 10 is set onto a base 12. Basic constructional unit 10 consists of a supporting body 1 wherefrom spacers 2 having differing lengths protrude towards the side facing away from base 12. Spacers 2 and supporting body 1 consist of the same material, i.e. polypropylene in this example, and are preformed via transfer moulding. Upwards of edge 4 of basic constructional unit 10, a thin covering layer 5 made of polypropylene is tightly tentered in a straight plane. Upwards therefrom, there is provided a stamp 8 having a front face 9 which is substantially formed according to the configuration the covering layer 5 is to assume after deformation thereof and connection with the basic constructional unit 10.

Figure 2:
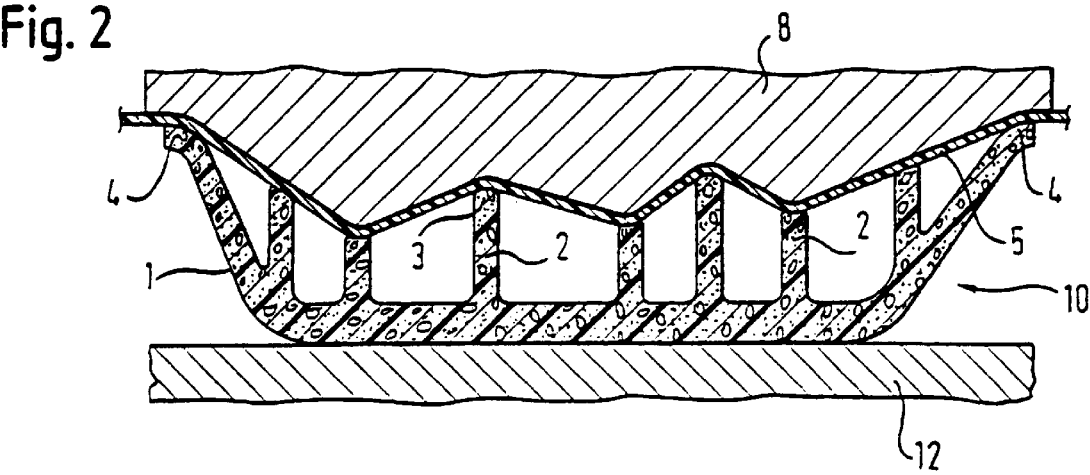

Now, stamp 8 is pressed downwards in the direction indicated by the arrows, from the position shown in FIG. 1 into the position shown in FIG. 2 in the direction of base 12, covering layer 5 being deformed such that it nestles against the outer contours of front face 9 and thereby contacts edge 4 of supporting body 1 as well as open front ends 3 of spacers 2 too. Via the use of pressure and heat in particular, it is provided for that strong and rigid connections are produced between covering unit 11, i.e. presently deformed covering layer 5, and basic constructional unit 10 at these "contact locations".

Figure 3:
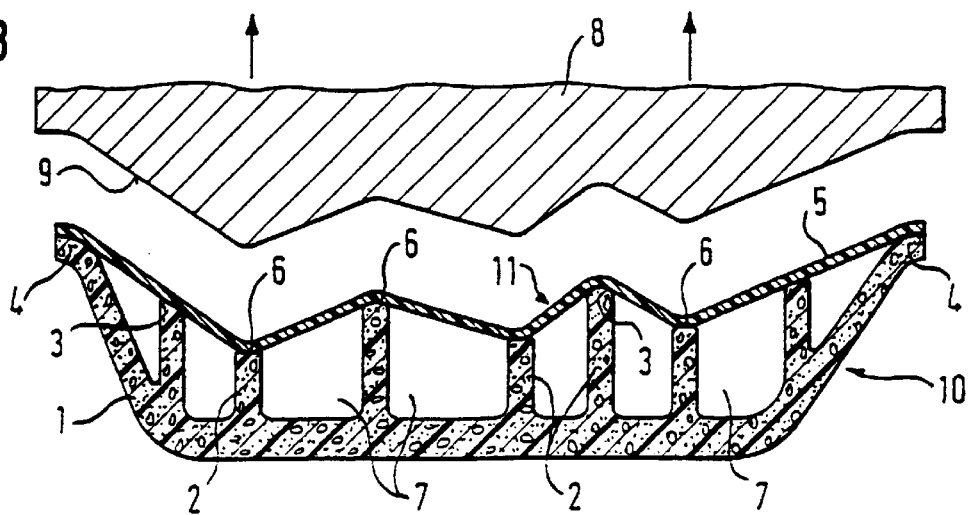

In a further method step according to FIG. 3, stamp 8 is again lifted off the now finished absorber in the direction indicated by the arrows, chamber-like intermediate cavities 7 being created between basic constructional unit 10, i.e. in supporting body 1 and web-shaped spacers 2 on the one hand and covering unit 11.

The invention substantially facilitates production since the covering unit need not be preformed. It is recommended to simultaneously deform and weld covering layer 5 with basic constructional unit 10 or, respectively, connect them in any other manner. For the purpose, covering layer 5 may also comprise an adhesive layer on that side where junctions 6 are to be created. Covering layer 5 may also be configured to be multi-layered. Thus, the outer layer may consist of an aluminium foil and the side facing the basic constructional unit may consist of a thermoplastic layer which melts during heating and connects to open front ends 3 or, respectively, edge 4 of basic constructional unit 10, in case thermoplastic material is used there too.

Inductive heating methods may also be used if aluminium is employed so that stamp 8 itself need not necessarily be heated to the softening temperature although this has proven to be advantageous in many cases.

Figure 4:
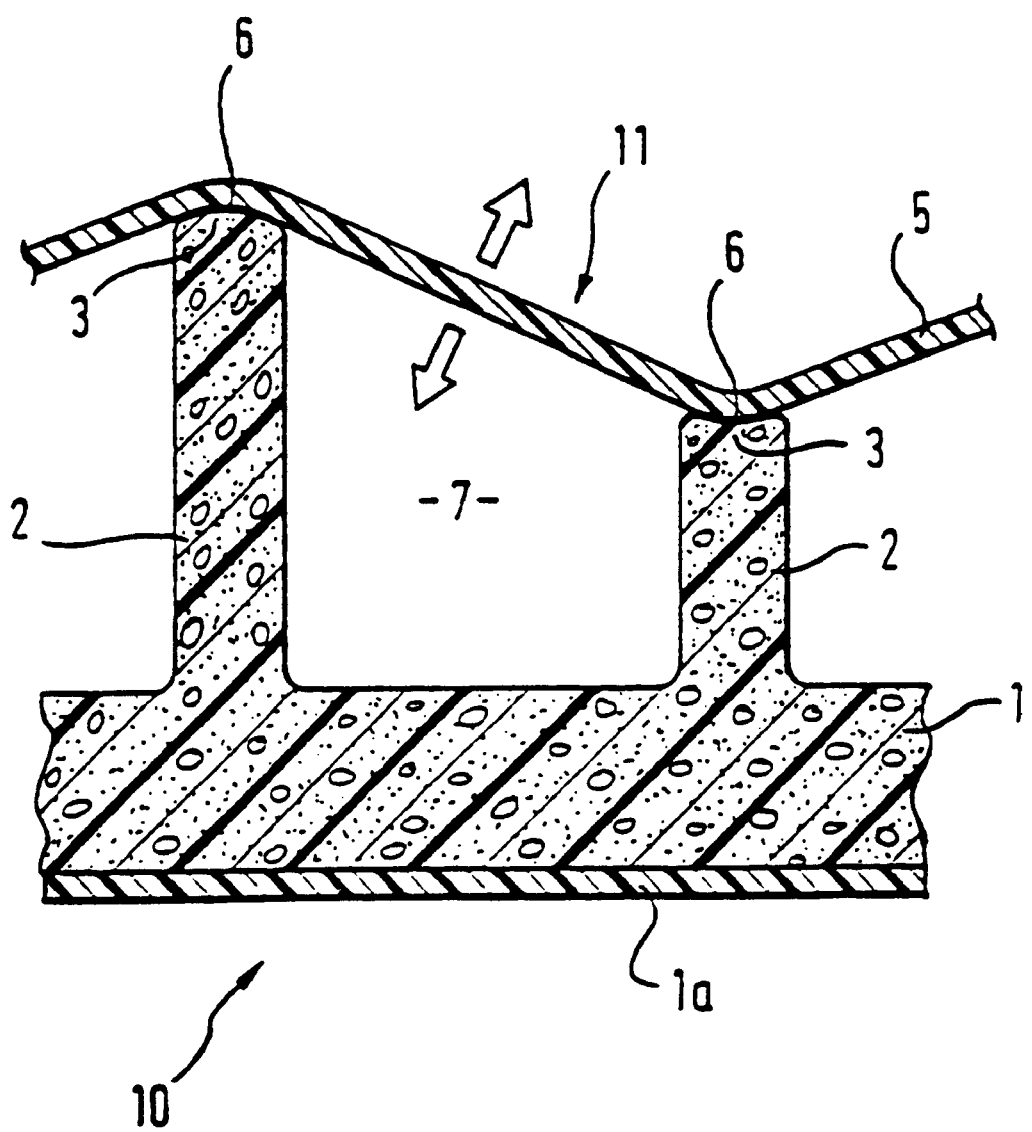
FIG. 4 shows a part-section of an absorber according to the invention.

According to FIG. 4, covering unit 11 consists of a polypropylene layer having a thickness of 1 mm, which is connected with basic constructional unit 10 by means of plastic weld connections along the open front ends 3 of spacers 2, i.e. at the rigid functions 6. However, covering unit 11 is able to vibrate in the regions between rigid junctions 6, as is indicated by the arrows. Therefore the vibrant portions of covering unit 11 are defined by the thickness and the material of covering layer 5 on the one hand and by the spacing of rigid junctions 6 on the other hand. Incident air sound is transferred to the gas space in the chamber-like intermediate cavities 7 via vibrating covering layer 5, optionally in an attenuated form. According to the dimensioning of intermediate cavities 7 as well as to the material of the walls thereof, specific frequency ranges may be dampened selectively. Basic constructional unit 10 is coated with a protective layer 1a on the underside.

FIGS. 5 to 8 show a different method variant for producing the absorber according to the invention in schematic sectional views. First, the preformed basic structural unit 10, which is set onto base 12, is heated with the aid of a heating tool 18 on the side facing away from the base 12, i.e. the facing-away surfaces of surrounding edge 4 as well as at open free ends 3 of spacers 2. Heating is carried out to such an extent that the surfaces of open front ends 3 and of edge 4 of basic constructional unit 10, which face heating tool 18, melt open.

Figure 5:
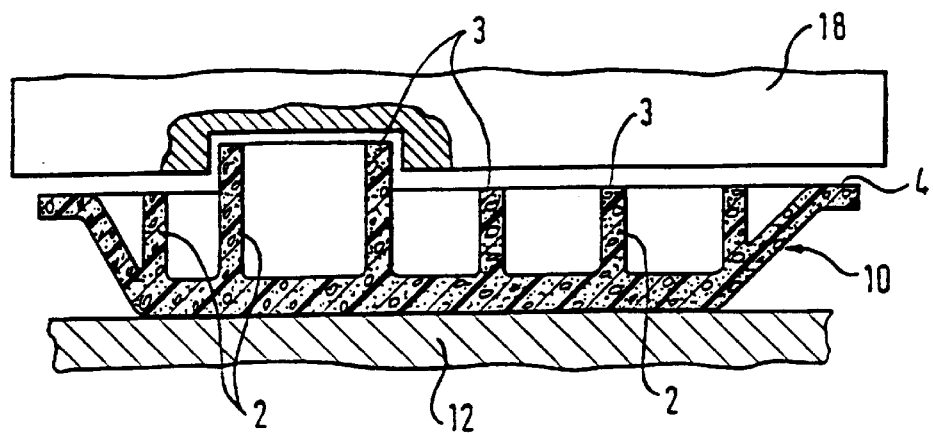
FIGS. 5 to 8 show method steps of a variant method.
Figure 6:
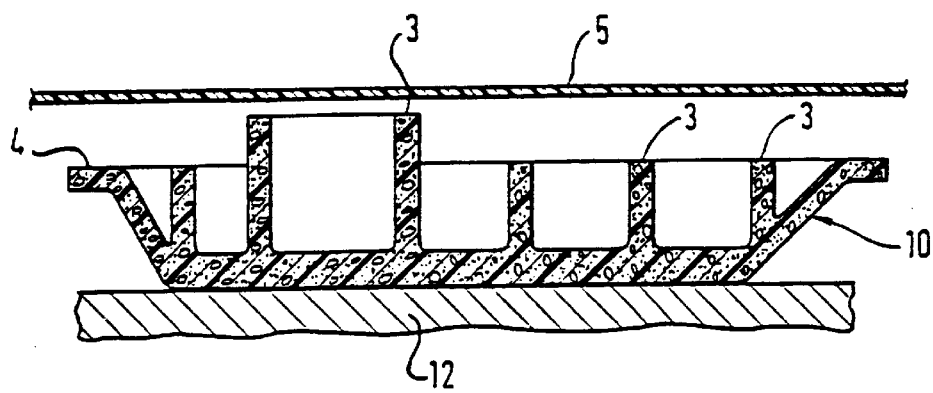

Then, heating tool 18, which effects, according to FIG. 5, plasticizing of the plastic material of basic constructional unit 10 via radiation heat or also by direct contact on the respective surfaces, is lifted off and a covering layer 5, which may also consist of several part-layers, is tentered at a spacing from basic constructional unit 10 in the manner indicated in FIG. 6.

Figure 7:
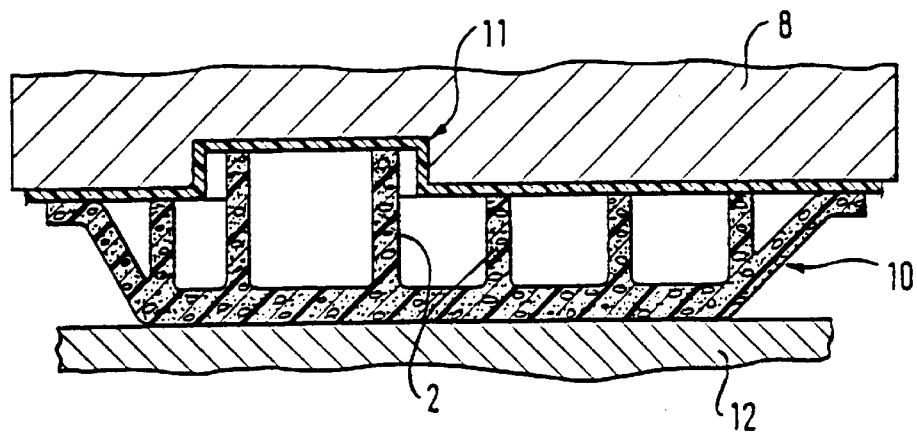
Figure 8:
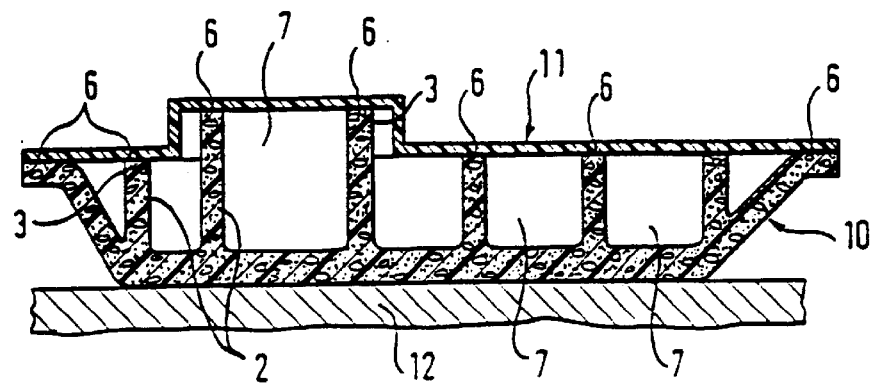

Subsequently, a press stamp 8 is set onto covering layer 5 from above in such a manner according to FIG. 7 that said layer deforms in correspondence with the configuration of the respective front face of stamp 8 and is pressed onto the molten-open portions of edge 4 and open front ends 3 of basic constructional unit 10 in the deformation state which is schematically shown in FIG. 7. Pressing is carried out until the plasticised material has been sufficiently solidified again so that a rigid mechanical connection is produced at the junctions 6 between the previously molten-open surfaces of edge 4 and open front ends 3 of spacers 2 on the one hand and the respective counter-surfaces of thin covering layer 5 on the other hand. Now stamp 8 may be removed so that there results the finished absorber which is shown in cross-section in FIG. 8 to have chamber-like intermediate cavities 7 between basic constructional unit 10 and preformed covering unit 11. As it were, all chambers 7 are completely closed while those portions of covering unit 11, which are situated between junctions 6 between basic constructional unit 10 and covering unit 11, still are able to vibrate.

In this alternative production method, it is also recommended to use thermoplastics for covering layer 5. It is more particularly recommended to use polypropylene. For certain applicational cases, a foamed layer of polypropylene is preferably used which has a layer thickness of about 0.5 to 10 mm. This thin foamed layer acts, as it were, as a "membrane" in those regions which cover chamber-like intermediate cavities 7. When the deformed thin covering layer 5 of PP foam is pressed on according to FIG. 7, for instance, the respective contact locations melt open until they are sufficiently plasticised in order to form a mechanically rigid connection with basic constructional unit 10 after cooling.

According to a further configuration of the invention, covering layer 5 comprises a fleece layer on the side facing basic constructional unit 10 unless it is even the whole covering layer 5 which consists of fleece fabric. PP fibers are preferably used for the fleece fabric so that there also occur melt or, respectively, melt-open processes. However, it has turned out that a sufficiently rigid mechanical connection with basic constructional unit 10 is possible, using the method according to FIGS. 5 to 10, if fleece fabrics made of fiber material, even without melting or melting-open thereof, since the protruding fiber particles become embedded in plasticised plastic to such an extent that there are created enough "anchorage locations" in the regions of junctions 6 after the plastic has cooled down and solidified. As at it were, the fibers "dig themselves in" if covering layer 5 is pressed sufficiently strongly onto basic constructional unit 10 or, respectively, its edge 4 and the open front ends 3 of spacers 2.

What is claimed is:

1. An absorber for absorbing acoustic sound waves, comprising
   a basic constructional unit (10) including a supporting body (1) and spacers (2) which protrude from the supporting body, and
   a covering unit (11) comprising a covering layer (5) connected to the spacers (2) of the supporting body (1) to close chamber-like intermediate cavities (7) between the supporting body (1) and spacers (2), wherein the spacers (2) are integrally preformed with the supporting body (1), the covering layer (5) being deformed, thin and able to vibrate in certain regions at least, said covering unit (11) being substantially rigidly connected both with an edge (4) of the basic constructional unit (10) and with open front ends (3) of spacers (2) characterized in that the basic constructional unit (10) consists of deep-drawn, transfer-moulded or injection-moulded thermoplastic or thermosetting material.

2. An absorber according to claim 1, characterized in that the basic constructional unit (10) is of fiber-reinforced plastic.

3. An absorber according to claim 1 or 2, characterized in that the covering unit (11) is deformed and solidified in a deformed shape.

4. An absorber according to claim 1, characterized in that the covering unit (11) is connected to the open front ends (3) of spacers (2) by rigid connections (6) defined by plastic welding connections.

5. An absorber according to claim 1, characterized in that the covering unit (11) comprises at least two layers, the covering layer facing the basic constructional unit (10) and comprising thermoplastic material.

6. An absorber according to claim 5, characterized in that the thermoplastic material of the covering layer (5) of the covering unit (11) comprises polypropylene, the covering unit (11) being thin.

7. An absorber according to claim 1, characterized in that the covering layer (11) is thin and comprises a thin aluminum layer.

8. A method for producing an absorber for absorbing acoustic sound waves, comprising a supporting body (1) and spacers (2) which protrude from the supporting body, and a covering layer (5) connected to the spacers (2) of the supporting body (1) to close chamber-like intermediate cavities (7) between the supporting body (1) and spacers (2), wherein the spacers (2) are integrally preformed with the supporting body (1) to define a basic constructional unit (10), the covering layer (5) being included in a covering unit (11) applied onto the basic constructional unit (10), the covering unit (11) being deformed and thin, the covering unit (11) being able to vibrate in certain regions at least, wherein the covering layer is deformed and connected with the basic constructional unit, characterized in that the method comprises the steps of:

performing the basic constructional unit (10);
   subsequently deforming the covering unit (11) from a more particularly straight plane, directly onto open front ends (3) of the spacers (2) and onto an edge (4) of the preformed basic constructional unit (10) by means of a stamp (8) which is configured to have a front face (9) in correspondence with the contours of the finished covering unit (11); and
   connecting, using pressure and/or heat, the covering unit (11) to the basic constructional unit (10).

9. A method according to claim 8, characterized in that the step of deforming the covering unit (11) by the stamp (8) comprises heating the covering unit (11) at least until the plastic at junctions of the covering unit (11) with the basic constructional unit (10) have softened.

10. A method according to claim 8 or 9, characterized in that the step of connecting the covering unit (11) to the basic constructional unit (10) comprises providing in a molten open condition, the open front ends (3) of spacers (2) and the edge (4) of the preformed basic constructional unit (10) and, subsequently, dressing the covering unit (11) onto the plasticised front ends (3) by means of the configured stamp (8), and cooling to solidify the front ends (3) to mechanically connect the front ends to the covering unit (11).

11. A method according to claim 8, characterized in that the step of connecting the covering unit (11) to the basic constructional unit (10) comprises heating, via inductive heating of an aluminum layer forming part of the covering unit (11), the plastic of the covering layer (5) at the functions with the basic constructional unit (10).

12. An absorber for absorbing acoustic sound waves, comprising:
   a basic constructional unit (10) including a supporting body (1), and integrally preformed spacers (2) protruding from said supporting body (1), the basic constructional unit (10) being of deep-drawn, transfer-molded or injection molded thermoplastic or thermosetting material; and
   a covering unit (11) comprising a covering layer (5) being connected with the basic constructional unit (10) and closing chamber-like intermediate cavities (7) between the supporting body (1), spacers (2) and covering layer (5) wherein said covering layer (5) is deformed and thin, said covering layer (5) having at least some regions able to vibrate in a membrane-like manner to transfer sound waves into said intermediate cavities (7) and wherein said covering unit (11) is substantially rigidly connected with an edge (4) of the basic constructional unit (10) and with open front ends (3) of the spacers (2) by rigid connections (6).

13. An absorber according to claim 12, characterized in that the basic constructional unit (10) is fiber-reinforced plastic.

14. An absorber according to claim 12 or 13, characterized in that said covering unit (11) is thin, said covering unit being deformable to a deformed shape and able to be solidified in the deformed shape.

15. An absorber according to claim 12, characterized in that the covering unit (11) is connected to the open front ends (3) of spacers (2) by rigid connections (6) defined by plastic welding connections.

16. An absorber according to claim 12, characterized in that the covering unit (11) comprises at least two layers, the covering layer facing the basic constructional unit (10) and comprising thermoplastic material.

17. An absorber according to claim 16, characterized in that said thermoplastic material of the covering layer (5) of the covering ring unit (11) comprises polypropylene, the covering unit (11) being thin.

18. An absorber according to claim 12, characterized in that said covering unit (11) is thin and comprises a thin aluminum layer.

19. A method for producing an absorber for absorbing acoustic sound waves, the method comprising the steps of:
deep-drawing, transfer-molding or injection molding thermoplastic or thermosetting material to form a basic constructional unit (10);
performing the basic constructional unit (10) to have spacers (2) protruding from an integral supporting body (1);
deforming a covering unit (11) comprising a covering layer (5) from a more particularly straight plane, directly onto open front ends (3) of said spacers (2) and onto an edge (4) of the preformed basic constructional unit (10) by means of a stamp (8) which is configured to have a front face (9) in correspondence with the contours of the finished deformed covering unit (11); and
connecting the covering layer (5), using pressure and/or heat, to the basic constructional unit (10) to close chamber-like intermediate cavities (7) between the supporting body (1) and spacers (2), said connection of the covering layer (5) both with the edge (4) of the basic constructional unit (10) and with open front ends (3) of the spacers (2) being by a substantially rigid connection (6) such that the covering layer (5) is deformed and thin, and such that the covering layer (5) is able to vibrate at least in certain regions in a membrane-like manner thereby transferring sound waves into said intermediate cavities (7).

20. A method according to claim 19, characterized in that the step of deforming the covering unit (11) by the stamp (8) comprises heating the covering unit (11) at least until the plastic at junctions of the covering unit (11) with the basic constructional unit (10) have softened.

21. A method according to claim 19 or 20, characterized in that the step of connecting the covering unit (11) to the basic constructional unit (10) comprises heating the open front ends (3) of spacers (2) and the edge (4) of the preformed basic constructional unit (10) and subsequently, pressing the covering unit (11) onto the plasticised front ends (3) by means of the configured stamp (8), and cooling the front ends (3) thereby to solidify the front ends such that the front ends are mechanically connected to the covering unit (11).

22. A method according to claim 19, characterized in that the step of connecting the covering unit (11) to the basic constructional unit (10) comprises heating, via inductive heating of an aluminum layer forming part of the covering unit (11), the plastic of the covering layer (5) at the junctions with the basic constructional unit (10).

23. An absorber for acoustic waves, comprising:
a supporting body;
spacers protruding from said supporting body to define chamber-like intermediate cavities between said supporting body and spacers; and
a covering layer connected to said spacers to close said intermediate cavities, said covering layer having resilient portions between said spacers to vibrate to transfer acoustic waves into said intermediate cavities.

24. An absorber according to claim 23, wherein said intermediate cavities are sized to provide selective dampening of specific acoustic frequency ranges.

25. An absorber according to claim 23, wherein said intermediate cavities are defined by inner surfaces of said supporting body, spacers and covering layer of a material for providing selective dampening of specific acoustic frequency ranges.

26. An absorber according to claim 23, wherein said spacers each have a front end, said spacers each having a respective length defined by the dimension between said supporting body and said respective front end, said respective lengths of said spacers being different.

27. An absorber according to claim 23, wherein said covering layer is connected to said spacers and supporting body by rigid connections.

28. An absorber according to claim 23, wherein said spacers are integrally connected to said supporting body.

29. An absorber according to claim 23, wherein said spacers and supporting body are of thermoplastic or thermosetting material.

30. An absorber according to claim 23, wherein said spacers and supporting body are of polypropylene.

31. An absorber according to claim 23, wherein the portions of said covering layer and spacers directly contacting one another, and the portions of said covering layer and supporting body directly contacting one another are formed of fiber-reinforced plastic.

32. An absorber according to claim 23, wherein said covering layer is of thermoplastic material.

33. An absorber according to claim 23, wherein said covering layer is of polypropylene.

34. An absorber according to claim 33, wherein said covering layer is of foamed polypropylene having a thickness of between 0.5 and 10 mm.

35. An absorber according to claim 23, and further comprising an aluminum layer connected to said covering layer.

36. An absorber according to claim 35, wherein said aluminum layer contacts the side of said covering layer facing away from said spacers.

37. An absorber according to claim 35, and further comprising a power source connected to said aluminum layer for heating said aluminum layer.

38. An absorber according to claim 37, wherein said power source provides electrical power to said aluminum layer.

39. An absorber according to claim 23, and further comprising an adhesive material between the portions of said covering layer directly contacting said supporting body, and between the portions of said covering layer directly contacting said spacers to provide said connections therebetween.

40. An absorber according to claim 23, and further comprising a protective layer connected to the surface of said supporting body facing away from said spacers.

41. A method for making an absorber for acoustic waves, the method comprising the steps of:

forming a supporting body;

forming spacers connected to the supporting body to define chamber-like intermediate cavities between the supporting body and spacers;

deforming a covering layer directly onto the spacers and onto the supporting body by a stamp having a front face corresponding to the contours of the spacers and supporting body, the front face of the stamp being continuous so that said deforming of the covering layer onto the spacers and supporting body closes the intermediate cavities; and connecting the deformed covering layer to the spacers and supporting body such that resilient portions of the covering layer between the spacers and supporting body vibrate to transfer sound waves into the intermediate cavities.

42. A method according to claim 41, wherein said forming steps comprise forming said supporting body integrally with said spacers.

43. A method according to claim 41, wherein a portion of the front face of the stamp is planar between a pair of adjacent spacers, said deforming step deforming the portion of the covering layer adjoining the portion of the front face into a contour defined by a planar surface containing the pair of adjacent spacers.

44. A method according to claim 41, wherein a portion of the front face of the stamp is recessed relative to a pair of adjacent spacers, said deforming step deforming the portion of the covering layer adjoining the portion of the front face into a contour defined by a non-planar surface containing the pair of adjacent spacers.

45. A method according to claim 41, wherein said steps comprise the steps of deep-drawing, transfer-moulding or injection molding thermoplastic or thermosetting material to form the supporting body and spacers.

46. A method according to claim 41, wherein said connecting step comprises the step of forcibly pressing the covering layer against the supporting body and spacers.

47. A method according to claim 41 and further comprising the step of heating to soften the covering layer and/or the supporting body and spacers before or contemporaneously with said deforming step, wherein said connecting step comprises solidifying the covering layer and/or spacers and supporting body to provide the connection therebetween.

48. A method according to claim 47, wherein said heating step comprises heating the stamp before and/or contemporaneously with said deforming step.

49. A method according to claim 47, and further comprising the step of connecting an aluminum layer to the covering layer, said heating step comprising heating the aluminum layer.

50. A method according to claim 49, wherein said heating step comprises electrically heating the aluminum layer.

51. A method according to claim 41, and further comprising the steps of:

forming the covering layer of thermoplastic; and connecting an aluminum layer to the side of the covering layer facing away from the spacers, said step of connecting the aluminum layer preceding said step of connecting the deformed covering layer to the spacers and supporting body, said step of connecting the deformed covering layer comprising heating the covering layer to a melted condition, positioning the melted covering layer into direct contact with the spacers and supporting body, and solidifying the melted covering layer to provide the connection between the covering layer, and the spacers and supporting body.

52. A method according to claim 41, wherein said connecting step comprises the step of forming rigid connections between the covering layer, and the spacers and supporting body.

53. A method according to claim 41, wherein the covering layer, supporting body and spacers are of plastic material, and further comprising the step of positioning fibrous material between the portions of the covering layer and spacers directly contacting one another, and between the portions of the covering layer and supporting body directly contacting one another before said deforming step, said deforming step comprising applying pressure and/or heat to the covering layer, supporting body and spacers to anchor the fibrous material in the covering layer, supporting body and spacers to provide a fiber-reinforced connection of the covering layer to the spacers and supporting body.

54. A method according to claim 41, and further comprising the step of forming the covering layer to have a planar contour, said step of forming the covering layer being before said deforming step.

* * * * *